(12) United States Patent
De Michele

(10) Patent No.: US 10,018,300 B1
(45) Date of Patent: Jul. 10, 2018

(54) DEMOUNTABLE ADJUSTABLE COUPLING SYSTEM

(71) Applicant: Christopher De Michele, Venice, FL (US)

(72) Inventor: Christopher De Michele, Venice, FL (US)

( * ) Notice: Subject to any disclaimer, the term of this patent is extended or adjusted under 35 U.S.C. 154(b) by 0 days.

(21) Appl. No.: 15/263,280

(22) Filed: Sep. 12, 2016

Related U.S. Application Data

(60) Provisional application No. 62/217,838, filed on Sep. 12, 2015.

(51) Int. Cl.
| | |
|---|---|
| *F16M 13/00* | (2006.01) |
| *F16M 13/02* | (2006.01) |
| *F16M 11/04* | (2006.01) |
| *F16M 11/06* | (2006.01) |
| *B60R 11/02* | (2006.01) |
| *A45F 5/02* | (2006.01) |
| *F16B 47/00* | (2006.01) |
| *B60R 11/00* | (2006.01) |

(52) U.S. Cl.
CPC ............... *F16M 13/02* (2013.01); *A45F 5/02* (2013.01); *B60R 11/02* (2013.01); *F16B 47/003* (2013.01); *F16M 11/041* (2013.01); *F16M 11/06* (2013.01); *F16M 13/00* (2013.01); *A45F 2005/025* (2013.01); *B60R 2011/0005* (2013.01); *B60R 2011/0007* (2013.01); *B60R 2011/0078* (2013.01); *B60R 2011/0085* (2013.01)

(58) Field of Classification Search
CPC .... F16M 2200/08; F16M 11/22; F16M 13/00; F16M 11/10; F16M 11/041; F16M 13/02; F16M 5/00; F16M 11/08; F16M 13/022; F16M 11/24; F16M 11/2014; F16M 11/42; F16M 7/00; F16M 11/00; F16M 11/18
USPC .. 248/291.1, 292.12, 346.01, 917, 919, 921, 248/922
See application file for complete search history.

(56) References Cited

U.S. PATENT DOCUMENTS

| | | |
|---|---|---|
| 5,850,996 A | 12/1998 | Liang |
| 6,955,279 B1 | 10/2005 | Mudd et al. |
| 8,141,210 B2 | 3/2012 | Colorado |
| 8,307,511 B2* | 11/2012 | Li ......................... G06F 1/1681 16/337 |
| 9,086,098 B2* | 7/2015 | Kalman .................... F16D 3/18 |
| D766,228 S * | 9/2016 | Haymond ................... D14/252 |
| 2002/0053629 A1* | 5/2002 | Hokugoh ............... F16M 11/10 248/371 |
| 2005/0164541 A1 | 7/2005 | Joy et al. |
| 2013/0168429 A1 | 7/2013 | Pearce |
| 2013/0181584 A1 | 7/2013 | Whitten et al. |
| 2014/0061271 A1 | 3/2014 | Tate |

* cited by examiner

*Primary Examiner* — Steven M Marsh

(57) ABSTRACT

A retainer with an essentially semicircular internal track having angularly spaced detent stops about a centrally located post, and a first surface, which may be affixed to an electronic device. An essentially circular mounting plate, selectively engages the detent stops for angular positioning with respect to the retainer and is configured for affixing to a second surface, which may be a convenient point of access or the user directly.

8 Claims, 9 Drawing Sheets

DEMOUNTABLE ADJUSTABLE COUPLING SYSTEM

CROSS-REFERENCE TO RELATED APPLICATION

This application claims the benefit of U.S. provisional application no. 62/217,838 filed on Sep. 12, 2015, the disclosure of which is incorporated by reference.

FIELD

The present invention relates generally to handheld and portable devices and more particularly, to convenient means for carrying, mounting, and/or attaching such electronic or similar devices.

BACKGROUND

Handheld cell phones, tablets, and other such portable devices have become common accessories, widely used for both personal and commercial purposes. As such, these devices are used constantly, at home, office and on the road. A way to carry these portable devices in a safe, accessible manner is therefore highly desirable.

Protective covers or cases may be available from the manufacturer or supplied as an aftermarket item. Access for ready use is another matter entirely and various solutions have been offered, some specific to a particular application, some perhaps better than others, but none ideally adapted to all circumstances.

What is needed is a system that will secure such devices to a surface while allowing angular adjustment of the device without removing the device from the surface.

SUMMARY

The present invention includes an apparatus to mount or carry functional components such as electronic devices or the like, allowing ready access to the electronic device and positioning of the electronic device for easy use. The electronic device is easily removed the electronic device is held securely until de-attached.

In some embodiments, the present invention includes a retainer having an essentially semicircular internal track, a centrally located post and spaced detent protrusions or "stops" around the internal track. In some embodiments, the detent protrusions are equally spaced. The retainer is for attaching to a first surface (e.g. a surface of a vehicle, a belt, a wall, an automobile dash, a console, a wrist or armband, any readily accessed second surface, etc.) and to a second surface (e.g. to a back surface of an electronic device, a housing or a case).

The first surface of the retainer is slightly spaced apart from the internal track to accept an essentially circular mounting plate there between. The essentially circular mounting plate has notches spaced to align with the detent stops and an offset boss portion for attachment to a third mounting surface, which is, for example, the surface of the electronic device. In some embodiments, the "boss" is a post that is integrally molded or attached to the surface.

In one example, the mounting plate with V gap is molded as part of our forearm mount, universal mount, tripod mount, cuff mount, etc. In some embodiments, a "safety bump" is molded-in as well. This component is then attached to an arm strap, wrist strap, an automobile dash, a console, a wrist or armband or bicycle, etc., The offset boss portion height allows clearance for inserting the mounting plate into the retainer to engage the semicircular internal track. A "V" shaped gap in the circular mounting plate bottoms on the centrally mounted post when it reaches full engagement.

The centrally mounted post serves as the pivotal axis of the retainer. The mounting plate detent notches engage with the retainer or, with more effort, flex and pass over the detent (primarily the detent flexes, but both will flex a little, however it is the detent that travels out of the way to allow plate to rotate). The mounting plate detent notches are made to engage with the retainer or, with more effort, to flex or depress the detent stop, or a combination of both stop to engage at another preferred angular orientation and hold the position, for example, while the electronic device is in use.

BRIEF DESCRIPTION OF THE DRAWINGS

The invention can be best understood by those having ordinary skill in the art by reference to the following detailed description when considered in conjunction with the accompanying drawings in which.

The drawings illustrate examples of how the inventions can be made and used but are not to be construed as limiting the inventions to only those examples illustrated and described. The various advantages and features of the present inventions will be apparent from a consideration of the drawings. Although this application discloses certain preferred embodiments and examples, it will be understood by those skilled in the art that the present inventions extend beyond the specifically disclosed embodiments to other alternative embodiments and/or uses of the inventions and obvious modifications and equivalents thereof.

DETAILED DESCRIPTION

Figure 1:
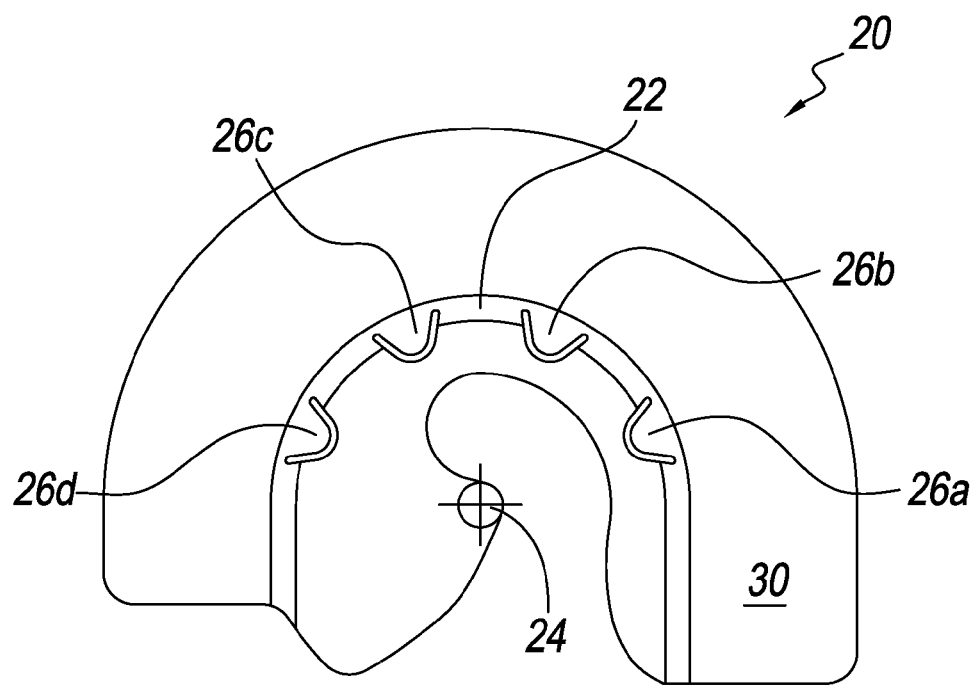
FIG. 1 is a plan view of the retainer of a preferred embodiment of the present inventions, showing the peripheral detent stops and the central post.

Reference will now be made in detail to the presently preferred embodiments of the invention, examples of which are illustrated in the accompanying drawings. Throughout the following detailed description, the same reference numerals refer to the same elements in all figures.

Figure 2:
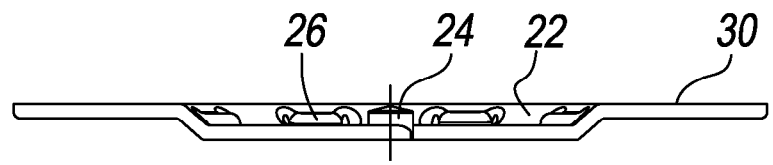
FIG. 2 is an edge view of the retainer of FIG. 1.
Figure 5:
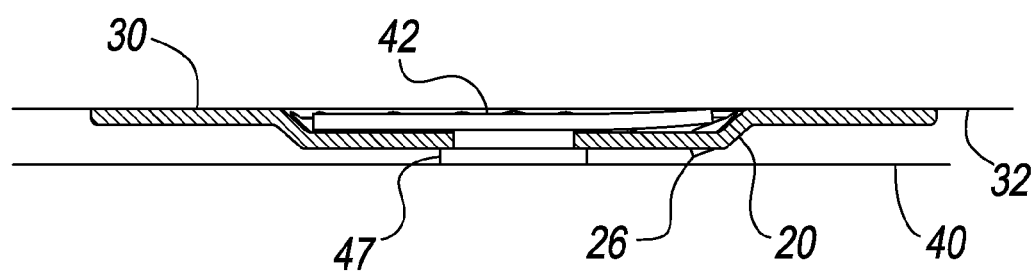
FIG. 5 is an edge view of the retainer of FIG. 1 and the mounting plate of FIG. 2 in assembly, showing depression of the detent stop and flexure of the plate over the stop at the right side and alternately, the engagement with a detent stop at the left side.

FIGS. 1, 2 and 5 show the retainer 20. The retainer 20 has an essentially semicircular internal track 22, a centrally located post 24 and a plurality of detent balls or stops 26a-26d around internal track 28. In some embodiments, the detent balls or stops 26a-26d are equally spaced. A first surface 30 which is, for example, the back surface; is adapted for attachment to second surface 32, which is, for example, an automobile dash, a console, a wrist or armband, or some other readily accessed location. The first surface 30 of retainer 20 is slightly spaced apart from internal track 22 to accept the essentially circular mounting plate 42 there between.

Figure 3:
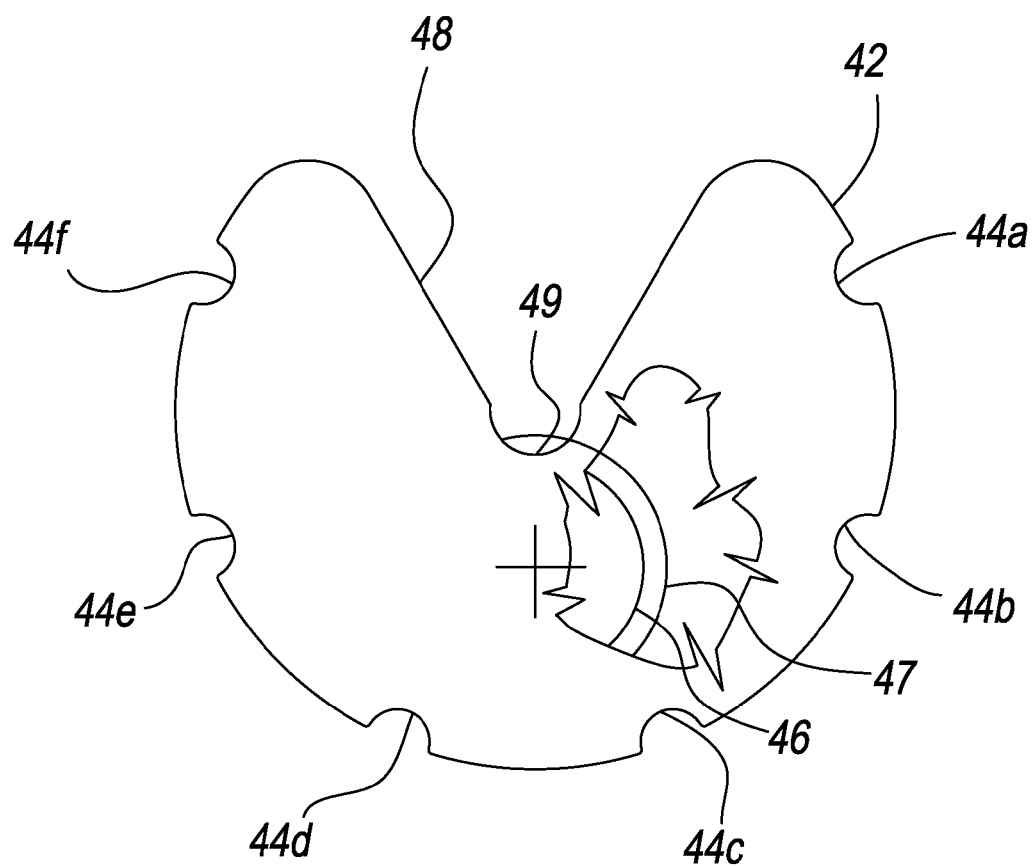
FIG. 3 is a plan view of the essentially circular mounting plate of the embodiment of FIG. 1 showing the "V" shaped opening and the detent stop receiving notches.
Figure 4:
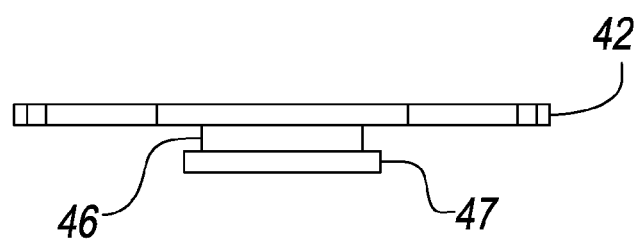
FIG. 4 is an edge view of the mounting plate of FIG. 2, showing the offset boss portion.

FIGS. 3, 4 and 5 show the essentially circular mounting plate 42 having a plurality of notches 44a-44f, spaced to align with detent stops 26a-26d, and an offset boss portion 46 for attachment to third mounting surface 40, which may be either the surface of the device, or an automobile dash, a console, a wristband or armband, or some other readily accessed surface. The thickness of offset boss portion 46 allows clearance for inserting mounting plate 42 into retainer 20 for engagement with semicircular internal track 22.

In some embodiments, the flange 47 of offset boss is enlarged in diameter to provide a greater area for adhesive attachment to second surface 40 and also to support the retainer 20 from contact therewith. The circular mounting plate 42 has centrally located radius 49 in "V" shaped opening 48, which fits and bottoms on centrally mounted post 24 as circular mounting plate 42 fully engages.

Figure 5A:
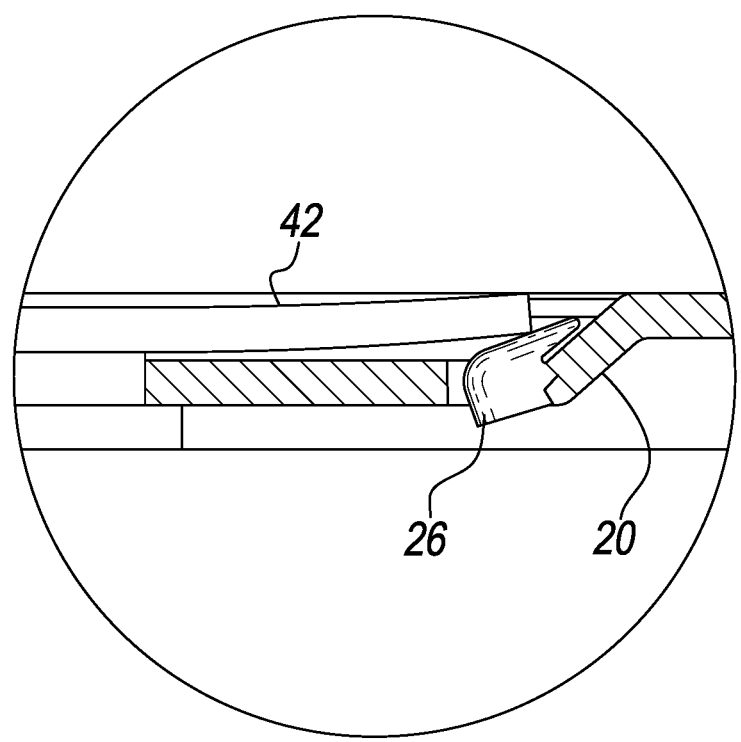
FIG. 5a is an enlarged detail of the FIG. 5 plate and detent stop.

The centrally mounted post 24 serves as the pivotal axis of retainer 20. The detent notches 44a-44f of mounting plate 42 are made and spaced to engage with retainer stops 26a-26d or, as shown in FIG. 5. The detent notches 44a-44f will flex with slight additional rotational effort and pass over the detent stops 26a-d, as shown in FIG. 5A, mounting plate 42 will flex, or detent stops 26a-d will depress, with slight additional effort, where the detent notches 44a-44f are held in a preferred angular orientation of first surface 32 with respect to second surface 40. This enables use of the electronic device in multiple orientations such as landscape and portrait, etc.

FIGS. 6-10 show how the retainer 20 and the detent stops 26a-d cooperate with mounting the plate 42 and the notches 44a-f for the useful orientation flexibility provided by the retainer 20.

Figure 6:
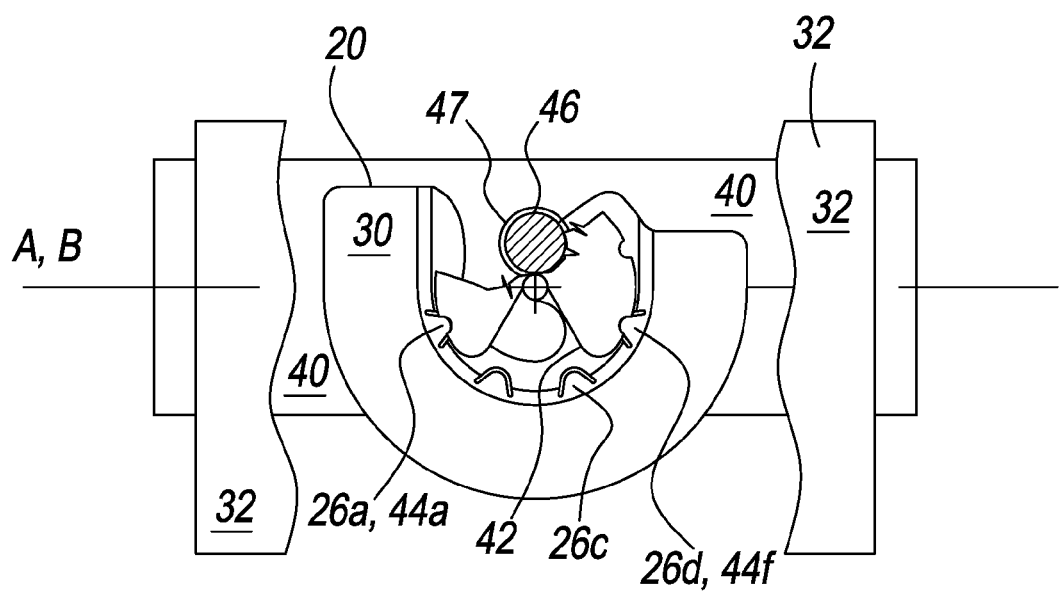
FIGS. 6-10 show axis A of the first surface and axis B of the third surface as they appear in optionally selected detent orientations.

FIG. 6 shows the relative position of the retainer 20 as the mounting plate 42 is inserted for coupling. In such, the "V" shaped opening 48 of mounting plate 42 aligns with post 24 to permit full insertion into retainer 20. In this position, detent stops 26a/26b engage with the mounting plate notches 44a/44b, orienting axis A of first surface 32 parallel to axis B of second surface 40.

Figure 7:
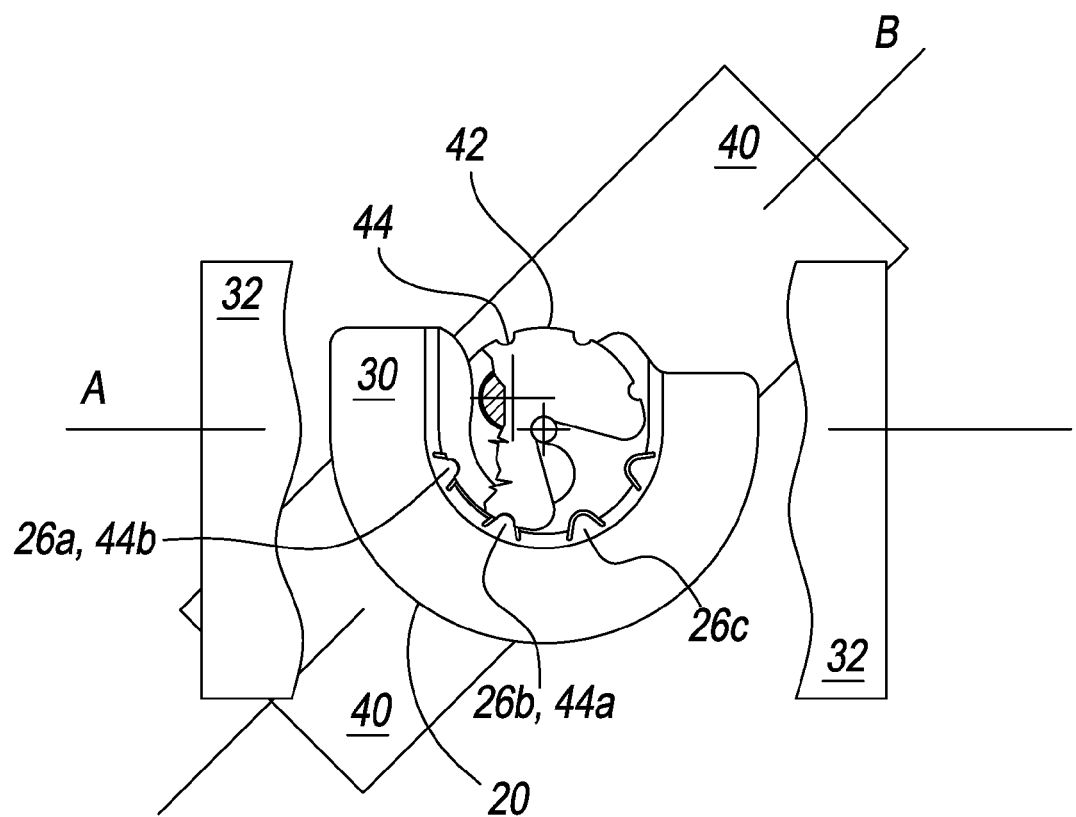

FIG. 7 shows the mounting plate 42 coupled as shown in FIG. 6, but with the detent stops 26a/26b/26c engaged with mounting the plate notch 44a-f so that axis A of first surface 32 is at 45° to axis B of second surface 40.

Figure 8:
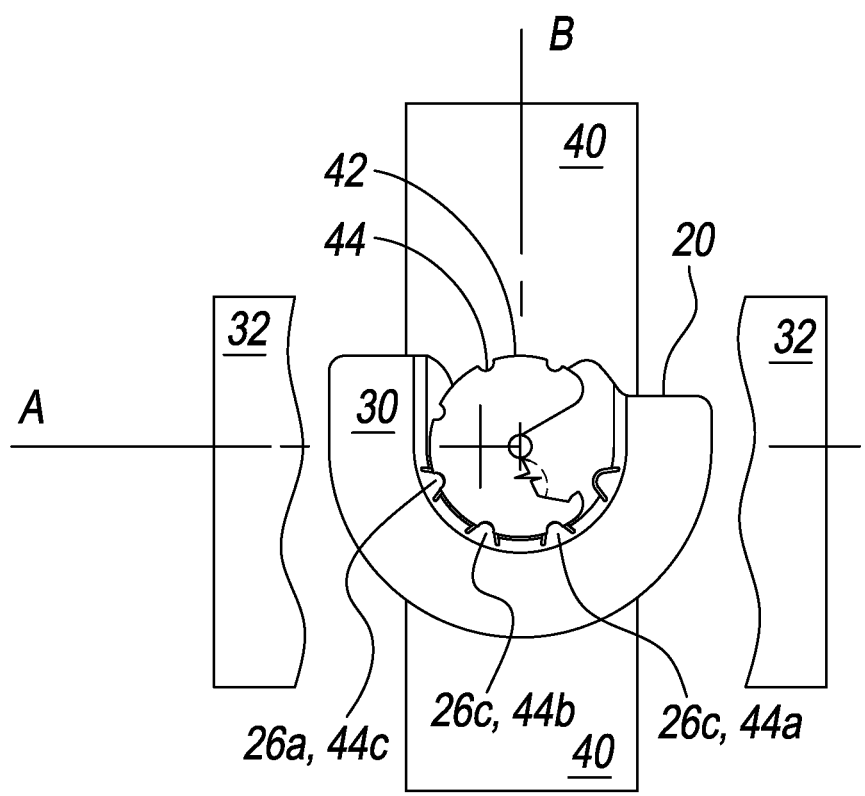

FIG. 8 shows mounting plate 42 coupled as shown in FIG. 7, but with detent stops 26a-26d engaged with the mounting plate notches 44a-44f to orient the axis A of the first surface 32 at 90° with respect to the axis B of the second surface 40.

Figure 9:
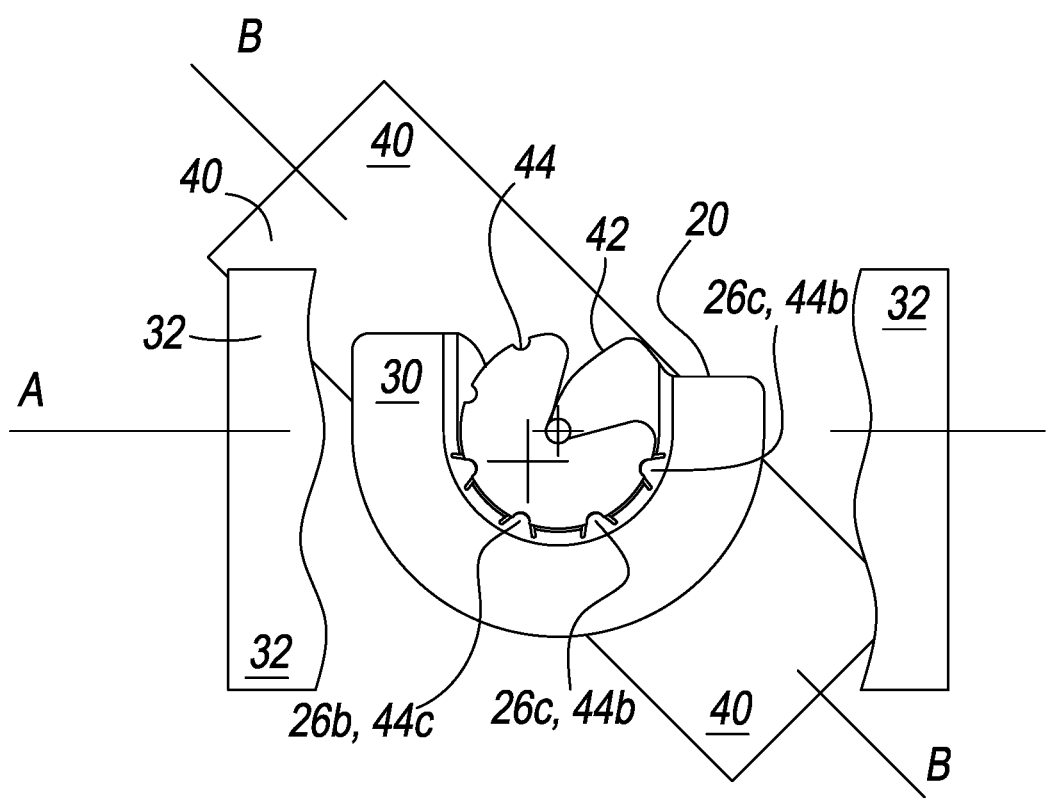

FIG. 9 shows the mounting plate 42 coupled as shown in FIG. 8, but with the detent stops 26a-26d engaged with the mounting plate notched 44a-44f to orient the axis A of first surface 32 at 135° to the axis B of the second surface 40.

Figure 10:
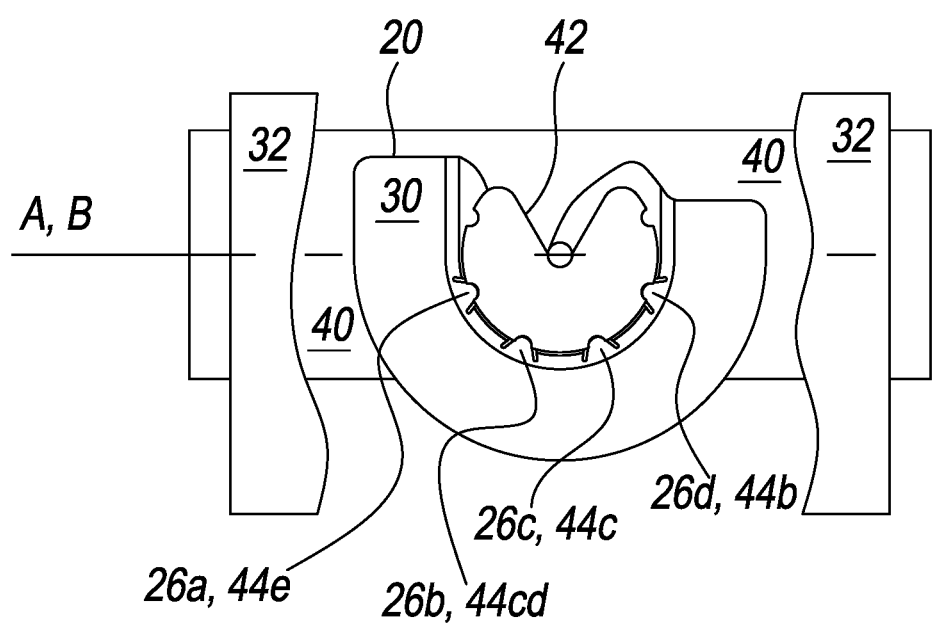

FIG. 10 shows the mounting plate 42 coupled as shown in FIG. 9, but with the detent stops 26a-26d engaged with the mounting plate notched 44a-44f to orient the axis A of the first surface 32 at 180° to the axis B of the second surface 40.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A demountable coupling apparatus for selective angular orientation of a device, comprising:
    a retainer for mounting or being formed on a first surface, the first surface having a first reference axis;
    a plurality of detent stops along a functionally semi-circular track of the retainer; and
    an essentially circular mounting plate configured for engagement with the semi-circular track and having a plurality of indexing notches spaced about a periphery of the mounting plate for detent stop engagement;
    whereas the mounting plate includes a portion configured for mounting on a second surface having a second reference axis such that an angular relationship of the first reference axis to the second reference axis is adjustable and held by at least one of the detent stops engaging with at least one of the indexing notches;
    whereas the essentially circular mounting plate is demountable from the functionally semi-circular track of the retainer in only one angular relationship of the first reference axis to the second reference axis.

2. The demountable coupling apparatus of claim 1, wherein the plurality of detent stops are equally spaced.

3. The demountable coupling apparatus of claim 1, wherein the first or second surface is that of a device selected from the group consisting of an electronic device, an automobile dash or console, a wall or cabinet, a tripod or selfie-stick, a drone, an elastic hand and an armband.

4. The demountable coupling apparatus of claim 1, wherein the second surface is that of an electronic device and the first surface is affixed to a user.

5. The demountable coupling apparatus of claim 1, wherein the first surface is that of an electronic device and the second surface is affixed to a user.

6. The demountable coupling apparatus of claim 1, wherein the first or second surface is a surface of a device selected from an electronic device, an automobile dash or console, a wall or cabinet, a tripod or selfie-stick, a drone, an elastic hand and an armband.

7. The demountable coupling apparatus of claim 3, wherein the first surface is that of an electronic device and the second surface is affixed to a user.

8. A demountable coupling apparatus for selective angular orientation of a device, the demountable coupling apparatus comprising:
    a retainer configured for mounting on a first surface, the first surface having a first reference axis;
    a plurality of detent stops along a functionally semi-circular track of the retainer;
    an essentially circular mounting plate configured for engagement with the semi-circular track; and
    a plurality of indexing notches spaced about a periphery of the circular mounting plate;
    whereas the mounting plate includes a surface configured for mounting on a second surface and having a second reference axis, such that an angular relationship of the first reference axis to the second reference axis is adjustable and after adjustment, the first reference axis to held in position with reference to the second reference axis by at least one detent stop engaging with at least one of the indexing notches;

whereas the essentially circular mounting plate is demountable from the functionally semi-circular track of the retainer in only one angular relationship of the first reference axis to the second reference axis.

\* \* \* \* \*